United States Patent
Wang et al.

(10) Patent No.: US 12,375,821 B2
(45) Date of Patent: Jul. 29, 2025

(54) MONO GUIDED BAYER DEMOSAIC IMAGE PROCESSING

(71) Applicant: QUALCOMM Incorporated, San Diego, CA (US)

(72) Inventors: Jing Wang, Saratoga, CA (US); Xiaoyun Jiang, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 152 days.

(21) Appl. No.: 18/466,433

(22) Filed: Sep. 13, 2023

(65) Prior Publication Data

US 2025/0088758 A1    Mar. 13, 2025

(51) Int. Cl.
*H04N 23/84* (2023.01)
*G06T 3/4015* (2024.01)
*H04N 23/45* (2023.01)
*H04N 23/951* (2023.01)

(52) U.S. Cl.
CPC ......... *H04N 23/843* (2023.01); *G06T 3/4015* (2013.01); *H04N 23/45* (2023.01); *H04N 23/951* (2023.01); *G06T 2207/10024* (2013.01); *G06T 2207/20212* (2013.01)

(58) Field of Classification Search
None
See application file for complete search history.

(56) References Cited

U.S. PATENT DOCUMENTS

2016/0080626 A1    3/2016 Kovtun et al.
2018/0359432 A1*  12/2018 Horak ............... H04N 23/21
2021/0006755 A1*   1/2021 Kim ................. G06N 3/045
2024/0320787 A1*   9/2024 Shen ................ G06T 5/70
2024/0323549 A1*   9/2024 Lee ................. H04N 23/30

FOREIGN PATENT DOCUMENTS

CN         116309163 A    6/2023

OTHER PUBLICATIONS

International Search Report and Written Opinion—PCT/US2024/045164—ISA/EPO—Dec. 13, 2024.

* cited by examiner

*Primary Examiner* — Paul M Berardesca
(74) *Attorney, Agent, or Firm* — QUALCOMM Incorporated

(57) ABSTRACT

This disclosure provides systems, methods, and devices for image signal processing that support improved demosaicing of color image signal. In a first aspect, a method of image processing includes receiving a first image frame and a second image frame. The method may also include determining a first demosaiced image frame by applying a first demosaic process to the first image frame and determining a second demosaiced image frame by applying a second demosaic process to the first image frame based on the second image frame. Blending weights may be determined based on the first image frame and the second image frame and a blended image frame may be determined by combining pixel values from corresponding portions of the first demosaiced image frame and the second demosaiced image frame according to the blending weights. Other aspects and features are also claimed and described.

30 Claims, 6 Drawing Sheets

MONO GUIDED BAYER DEMOSAIC IMAGE PROCESSING

TECHNICAL FIELD

Aspects of the present disclosure relate generally to image processing, and more particularly, to image processing of color image signals. Some features may enable and provide improved image processing, including improved demosaicing of color image signals.

INTRODUCTION

Image capture devices are devices that can capture one or more digital images, whether still images for photos or sequences of images for videos. Capture devices can be incorporated into a wide variety of devices. By way of example, image capture devices may comprise stand-alone digital cameras or digital video camcorders, camera-equipped wireless communication device handsets, such as mobile telephones, cellular or satellite radio telephones, personal digital assistants (PDAs), panels or tablets, gaming devices, computing devices such as webcams, video surveillance cameras, or other devices with digital imaging or video capabilities.

Color images may be captured as color image signals captured by discrete sensor elements within an image sensor. For many types of color image sensors, these color image signals may need to be further processed as a result of the structure and methodology of the image sensors. In particular, a single sensor element may only be able to capture one color (red, green, or blue) at a given pixel location. The incomplete color information at each sensor element location results in a mosaic of colors. To acquire a full-color image across all pixels, spatial interpolation processes, known as demosaicing, may need to be applied to the image signals. Demosaicing may estimate the missing color information at each pixel and create a coherent, full-color image.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In a multi-camera configuration, both color and monochromatic sensors may be utilized together to augment the light sensitivity in color imaging. Conventionally, each image stream may be individually processed with distinct demosaic and ISP processes before their amalgamation upon output conversion. However, demosaicing of color images can introduce artifacts including color aliasing or false color and a reduced resolution compared to corresponding images (such as monochromatic images).

In various aspects, the proposed techniques improve upon this by guiding the demosaic process with a filter derived from another image (such as a monochromatic image). Specifically, both the images may be registered and scaled, and features of one image (such as a monochromatic image) are used to guide the extraction of RGB values from the other image (such as a color image). Blending weights are determined through comparing values of the images. For instance, when the monochromatic image is flat and the RGB image illustrates texture or edge, the weight may be biased towards the RGB image.

In certain implementations, blending weights may be determined based on comparing corresponding locations of the first and second image frames. In such instances, the weights may increase for locations where pixel values are within a threshold of one another. Such implementations improve the determination of blending weights, ensuring that detail from the optimal demosaiced image is extracted at each location within the image, improving image quality. The blending weights may be determined on a pixelwise basis, ensuring precise ability to select between the demosaiced images in higher detail, further improving image quality. A monochromatic image frame may be used as a guided filter for a demosaic process to enhance the resulting image clarity by reducing color aliasing and increasing luminosity.

In one aspect, a method is provided that includes receiving a first image frame and a second image frame; determining a first demosaiced image frame by applying a first demosaic process to the first image frame, determining a second demosaiced image frame by applying a second demosaic process to the first image frame based on the second image frame, determining blending weights based on the first image frame and the second image frame, and determining a blended image frame by combining pixel values from corresponding portions of the first demosaiced image frame and the second demosaiced image frame according to the blending weights.

In another aspect, an apparatus is provided that includes a memory storing processor-readable code and at least one processor coupled to the memory. The at least one processor may be configured to execute the processor-readable code to cause the at least one processor to perform operations including: receiving a first image frame and a second image frame; determining a first demosaiced image frame by applying a first demosaic process to the first image frame; determining a second demosaiced image frame by applying a second demosaic process to the first image frame based on the second image frame; determining blending weights based on the first image frame and the second image frame; and determining a blended image frame by combining pixel values from corresponding portions of the first demosaiced image frame and the second demosaiced image frame according to the blending weights.

In a further aspect, a non-transitory computer-readable medium storing instructions that, when executed by a processor, cause the processor to perform operations that include receiving a first image frame and a second image frame; determining a first demosaiced image frame by applying a first demosaic process to the first image frame, determining a second demosaiced image frame by applying a second demosaic process to the first image frame based on the second image frame, determining blending weights based on the first image frame and the second image frame, and determining a blended image frame by combining pixel values from corresponding portions of the first demosaiced image frame and the second demosaiced image frame according to the blending weights.

In an additional aspect, an image capture device is provided that includes a first image sensor, a second image sensor, a memory storing processor-readable code, and at least one processor coupled to the memory, the first image sensor, and the second image sensor. The at least one processor may be configured to execute the processor-readable code to cause the at least one processor to perform operations that include receiving a first image frame from the first image sensor and a second image frame from the second image sensor; determining a first demosaiced image frame by applying a first demosaic process to the first image frame; determining a second demosaiced image frame by applying a second demosaic process to the first image frame based on the second image frame; determining blending weights based on the first image frame and the second image frame; and determining a blended image frame by combining pixel values from corresponding portions of the first demosaiced image frame and the second demosaiced image frame according to the blending weights.

Methods of image processing described herein may be performed by an image capture device and/or performed on image data captured by one or more image capture devices. Image capture devices, devices that can capture one or more digital images, whether still image photos or sequences of images for videos, can be incorporated into a wide variety of devices. By way of example, image capture devices may comprise stand-alone digital cameras or digital video camcorders, camera-equipped wireless communication device handsets, such as mobile telephones, cellular or satellite radio telephones, personal digital assistants (PDAs), panels or tablets, gaming devices, computing devices such as webcams, video surveillance cameras, or other devices with digital imaging or video capabilities.

The image processing techniques described herein may involve digital cameras having image sensors and processing circuitry (e.g., application specific integrated circuits (ASICs), digital signal processors (DSP), graphics processing unit (GPU), or central processing units (CPU)). An image signal processor (ISP) may include one or more of these processing circuits and configured to perform operations to obtain the image data for processing according to the image processing techniques described herein and/or involved in the image processing techniques described herein. The ISP may be configured to control the capture of image frames from one or more image sensors and determine one or more image frames from the one or more image sensors to generate a view of a scene in an output image frame. The output image frame may be part of a sequence of image frames forming a video sequence. The video sequence may include other image frames received from the image sensor or other images sensors.

In an example application, the image signal processor (ISP) may receive an instruction to capture a sequence of image frames in response to the loading of software, such as a camera application, to produce a preview display from the image capture device. The image signal processor may be configured to produce a single flow of output image frames, based on images frames received from one or more image sensors. The single flow of output image frames may include raw image data from an image sensor, binned image data from an image sensor, or corrected image data processed by one or more algorithms within the image signal processor. For example, an image frame obtained from an image sensor, which may have performed some processing on the data before output to the image signal processor, may be processed in the image signal processor by processing the image frame through an image post-processing engine (IPE) and/or other image processing circuitry for performing one or more of tone mapping, portrait lighting, contrast enhancement, gamma correction, etc. The output image frame from the ISP may be stored in memory and retrieved by an application processor executing the camera application, which may perform further processing on the output image frame to adjust an appearance of the output image frame and reproduce the output image frame on a display for view by the user.

After an output image frame representing the scene is determined by the image signal processor and/or determined by the application processor, such as through image processing techniques described in various embodiments herein, the output image frame may be displayed on a device display as a single still image and/or as part of a video sequence, saved to a storage device as a picture or a video sequence, transmitted over a network, and/or printed to an output medium. For example, the image signal processor (ISP) may be configured to obtain input frames of image data (e.g., pixel values) from the one or more image sensors, and in turn, produce corresponding output image frames (e.g., preview display frames, still-image captures, frames for video, frames for object tracking, etc.). In other examples, the image signal processor may output image frames to various output devices and/or camera modules for further processing, such as for 3 A parameter synchronization (e.g., automatic focus (AF), automatic white balance (AWB), and automatic exposure control (AEC)), producing a video file via the output frames, configuring frames for display, configuring frames for storage, transmitting the frames through a network connection, etc. Generally, the image signal processor (ISP) may obtain incoming frames from one or more image sensors and produce and output a flow of output frames to various output destinations.

In some aspects, the output image frame may be produced by combining aspects of the image correction of this disclosure with other computational photography techniques such as high dynamic range (HDR) photography or multi-frame noise reduction (MFNR). With HDR photography, a first image frame and a second image frame are captured using different exposure times, different apertures, different lenses, and/or other characteristics that may result in improved dynamic range of a fused image when the two image frames are combined. In some aspects, the method may be performed for MFNR photography in which the first image frame and a second image frame are captured using the same or different exposure times and fused to generate a corrected first image frame with reduced noise compared to the captured first image frame.

In some aspects, a device may include an image signal processor or a processor (e.g., an application processor) including specific functionality for camera controls and/or processing, such as enabling or disabling the binning module or otherwise controlling aspects of the image correction. The methods and techniques described herein may be entirely performed by the image signal processor or a processor, or various operations may be split between the image signal processor and a processor, and in some aspects split across additional processors.

The device may include one, two, or more image sensors, such as a first image sensor. When multiple image sensors are present, the image sensors may be differently configured. For example, the first image sensor may have a larger field of view (FOV) than the second image sensor, or the first image sensor may have different sensitivity or different dynamic range than the second image sensor. In one example, the first image sensor may be a wide-angle image sensor, and the second image sensor may be a tele image sensor. In another example, the first sensor is configured to obtain an image through a first lens with a first optical axis and the second sensor is configured to obtain an image through a second lens with a second optical axis different from the first optical axis. Additionally or alternatively, the first lens may have a first magnification, and the second lens may have a second magnification different from the first magnification. Any of these or other configurations may be part of a lens cluster on a mobile device, such as where multiple image sensors and associated lenses are located in offset locations on a frontside or a backside of the mobile device. Additional image sensors may be included with larger, smaller, or same field of views. The image processing techniques described herein may be applied to image frames captured from any of the image sensors in a multi-sensor device.

In an additional aspect of the disclosure, a device configured for image processing and/or image capture is disclosed. The apparatus includes means for capturing image frames. The apparatus further includes one or more means for capturing data representative of a scene, such as image sensors (including charge-coupled devices (CCDs), Bayer-filter sensors, infrared (IR) detectors, ultraviolet (UV) detectors, complimentary metal-oxide-semiconductor (CMOS) sensors) and time of flight detectors. The apparatus may further include one or more means for accumulating and/or focusing light rays into the one or more image sensors (including simple lenses, compound lenses, spherical lenses, and non-spherical lenses). These components may be controlled to capture the first and/or second image frames input to the image processing techniques described herein.

Other aspects, features, and implementations will become apparent to those of ordinary skill in the art, upon reviewing the following description of specific, exemplary aspects in conjunction with the accompanying figures. While features may be discussed relative to certain aspects and figures below, various aspects may include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects may be implemented in various devices, systems, and methods.

The method may be embedded in a computer-readable medium as computer program code comprising instructions that cause a processor to perform the steps of the method. In some embodiments, the processor may be part of a mobile device including a first network adaptor configured to transmit data, such as images or videos in a recording or as streaming data, over a first network connection of a plurality of network connections; and a processor coupled to the first network adaptor and the memory. The processor may cause the transmission of output image frames described herein over a wireless communications network such as a 5G NR communication network.

The foregoing has outlined, rather broadly, the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
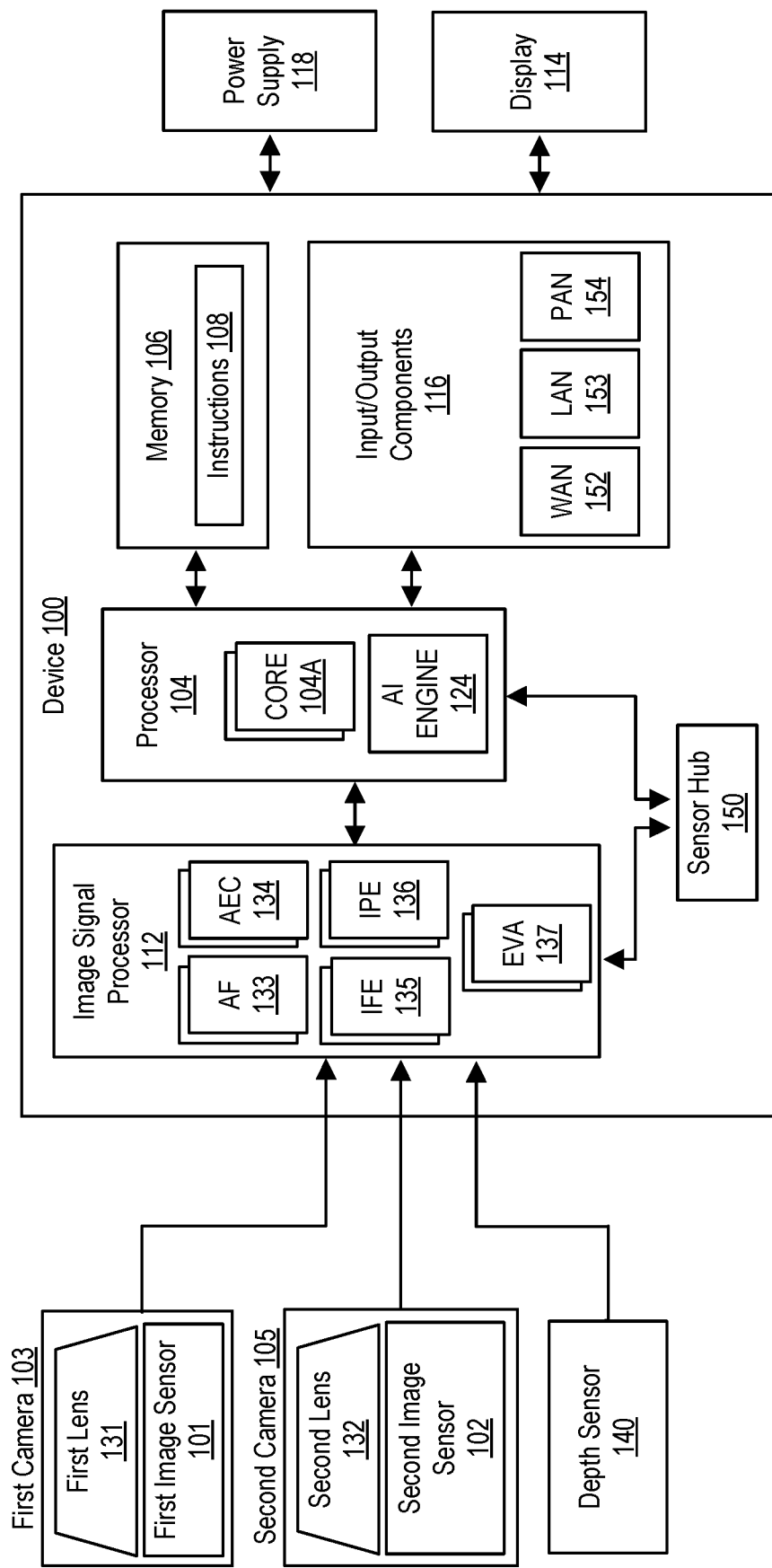
FIG. 1 shows a block diagram of an example device for performing image capture from one or more image sensors.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support image processing, including techniques for demosaicing of color image signals.

In particular, combined image sensor applications may use two or more image sensors of different types to capture images. For example, a Bayer and mono combined system may include a Bayer image sensor and a mono image sensor. The Bayer sensor may utilize a color filter array to capture color information, while the mono sensor may capture only luminance information. This combination allows for the capture of both full-color images and higher-sensitivity black-and-white images.

In such combined systems, color images and monochromatic images may be processed using separate pipelines, which may include demosaicing, color correction, gamma correction, and output conversion (such as to YUV signals). Demosaicing may be particularly challenging due to the sampling nature of Bayer images. This process involves reconstructing full-color images from the incomplete color information captured by the Bayer sensor. However, demosaicing can introduce limitations and challenges such as false color or color aliasing and reduced resolution compared to the full-resolution mono image. On the other hand, monochromatic images may skip demosaicing and may only go through gamma correction since they capture grayscale information directly. Once both Bayer and mono images have been processed separately, fusion of the images may be performed. However, given the shortcomings of the demosaicing process, fusion may incorporate issues from color images, such as false colors, color aliasing, and reduced resolution.

One solution to this problem is to determine multiple demosaiced images for a received color image and to blend those images based on a corresponding image (such as a separate, monochromatic image). In one example, a computing device receives a first image frame and a second image frame. In certain implementations, the first image frame may be a color image frame and the second image frame may be a monochromatic image frame. In certain implementations, the computing device may perform registration and scaling of the first image frame and the second image frame. The computing device may determine a first demosaiced image frame by applying a first demosaic process to the first image frame and may determine a second demosaiced image frame by applying a second demosaic process to the first image frame based on the second image frame. For example, the monochromatic image frame may be applied as a guided filter for the second demosaic process. The computing device may determine blending weights based on the first image frame and the second image frame, and may also determine a blended image frame by combining pixel values from corresponding portions of the first demosaiced image frame and the second demosaiced image frame according to the blending weights. The blending weights may be determined for locations within the second demosaiced image frame based on comparisons of corresponding locations of the first image frame and the second image frame. For example, weights assigned to the second demosaiced image frame could increase for corresponding locations of the first image frame and the second image frame with pixel values within a threshold. The blending weights might also be determined based on variance measurements between the first image frame and the second image frame, texture comparisons between the first image frame and the second image frame, edges detected within the first image frame and the second image frame, or a combination thereof. Also, blending weights may be determined for each pixel within the second demosaiced image frame and the blended image frame may be determined as a pixelwise combination of the first demosaiced image frame and the second demosaiced image frame.

Particular implementations of the subject matter described in this disclosure may be implemented to realize one or more of the following potential advantages or benefits. In some aspects, the present disclosure provides techniques for fusion that combine the advantages of both types of images to enhance overall image quality and provide a more comprehensive representation of the scene. In particular, the proposed techniques improve the fusion techniques for combined image sensor applications, allowing for better capture of the higher sensitivity and resolution of the monochromatic images while also incorporating the improved color information from color sensors. Furthermore, the proposed techniques reduce the negative visual artifacts from the demosaicing processes, enabling the incorporation of the improved coloring information without sacrificing other aspects of the images. Accordingly, the proposed techniques improve the image quality of captured images.

One major benefit of improved image quality is that it allows for better and more accurate/attractive capture of image subjects. With better image quality, cameras and smartphones can capture more details, colors, and sharpness in photos and videos. For example, by reducing artifacts and other errors, improved image quality may better reflect the subjects of the image. As another example, improved resolution may preserve more details of the subjects of captured images. Overall, better image quality enhances the visual experience for consumers and end users, making captured images more enjoyable and immersive.

Shortcomings mentioned here are only representative and are included to highlight problems that the inventors have identified with respect to existing devices and sought to improve upon. Aspects of devices described below may address some or all of the shortcomings as well as others known in the art. Aspects of the improved devices described herein may present other benefits than, and be used in other applications than, those described above.

In the description of embodiments herein, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well known circuits and devices are shown in block diagram form to avoid obscuring teachings of the present disclosure.

Some portions of the detailed descriptions which follow are presented in terms of procedures, logic blocks, processing, and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

An example device for capturing image frames using one or more image sensors, such as a smartphone, may include a configuration of one, two, three, four, or more camera modules on a backside (e.g., a side opposite a primary user display) and/or a front side (e.g., a same side as a primary user display) of the device. The devices may include one or more image signal processors (ISPs), Computer Vision Processors (CVPs) (e.g., AI engines), or other suitable circuitry for processing images captured by the image sensors. The one or more image signal processors (ISP) may store output image frames (such as through a bus) in a memory and/or provide the output image frames to processing circuitry (such as an applications processor). The processing circuitry may perform further processing, such as for encoding, storage, transmission, or other manipulation of the output image frames.

As used herein, a camera module may include the image sensor and certain other components coupled to the image sensor used to obtain a representation of a scene in image data comprising an image frame. For example, a camera module may include other components of a camera, including a shutter, buffer, or other readout circuitry for accessing individual pixels of an image sensor. In some embodiments, the camera module may include one or more components including the image sensor included in a single package with an interface configured to couple the camera module to an image signal processor or other processor through a bus.

FIG. 1 shows a block diagram of a device 100 for performing image capture from one or more image sensors. The device 100 may include, or otherwise be coupled to, an image signal processor (e.g., ISP 112) for processing image frames from one or more image sensors, such as a first image sensor 101, a second image sensor 102, and a depth sensor 140. In some implementations, the device 100 also includes or is coupled to a processor 104 and a memory 106 storing instructions 108 (e.g., a memory storing processor-readable code or a non-transitory computer-readable medium storing instructions). The device 100 may also include or be coupled to a display 114 and components 116. Components 116 may be used for interacting with a user, such as a touch screen interface and/or physical buttons.

Components 116 may also include network interfaces for communicating with other devices, including a wide area network (WAN) adaptor (e.g., WAN adaptor 152), a local area network (LAN) adaptor (e.g., LAN adaptor 153), and/or a personal area network (PAN) adaptor (e.g., PAN adaptor 154). A WAN adaptor 152 may be a 4G LTE or a 5G NR wireless network adaptor. A LAN adaptor 153 may be an IEEE 802.11 WiFi wireless network adapter. A PAN adaptor 154 may be a Bluetooth wireless network adaptor. Each of the WAN adaptor 152, LAN adaptor 153, and/or PAN adaptor 154 may be coupled to an antenna, including multiple antennas configured for primary and diversity reception and/or configured for receiving specific frequency bands. In some embodiments, antennas may be shared for communicating on different networks by the WAN adaptor 152, LAN adaptor 153, and/or PAN adaptor 154. In some embodiments, the WAN adaptor 152, LAN adaptor 153, and/or PAN adaptor 154 may share circuitry and/or be packaged together, such as when the LAN adaptor 153 and the PAN adaptor 154 are packaged as a single integrated circuit (IC).

The device 100 may further include or be coupled to a power supply 118 for the device 100, such as a battery or an adaptor to couple the device 100 to an energy source. The device 100 may also include or be coupled to additional features or components that are not shown in FIG. 1. In one example, a wireless interface, which may include a number of transceivers and a baseband processor in a radio frequency front end (RFFE), may be coupled to or included in WAN adaptor 152 for a wireless communication device. In a further example, an analog front end (AFE) to convert analog image data to digital image data may be coupled between the first image sensor 101 or second image sensor 102 and processing circuitry in the device 100. In some embodiments, AFEs may be embedded in the ISP 112.

The device may include or be coupled to a sensor hub 150 for interfacing with sensors to receive data regarding movement of the device 100, data regarding an environment around the device 100, and/or other non-camera sensor data. One example non-camera sensor is a gyroscope, which is a device configured for measuring rotation, orientation, and/or angular velocity to generate motion data. Another example non-camera sensor is an accelerometer, which is a device configured for measuring acceleration, which may also be used to determine velocity and distance traveled by appropriately integrating the measured acceleration. In some aspects, a gyroscope in an electronic image stabilization system (EIS) may be coupled to the sensor hub. In another example, a non-camera sensor may be a global positioning system (GPS) receiver, which is a device for processing satellite signals, such as through triangulation and other techniques, to determine a location of the device 100. The location may be tracked over time to determine additional motion information, such as velocity and acceleration. The data from one or more sensors may be accumulated as motion data by the sensor hub 150. One or more of the acceleration, velocity, and/or distance may be included in motion data provided by the sensor hub 150 to other components of the device 100, including the ISP 112 and/or the processor 104.

The ISP 112 may receive captured image data. In one embodiment, a local bus connection couples the ISP 112 to the first image sensor 101 and second image sensor 102 of a first camera 103 and second camera 105, respectively. In another embodiment, a wire interface couples the ISP 112 to an external image sensor. In a further embodiment, a wireless interface couples the ISP 112 to the first image sensor 101 or second image sensor 102.

The first image sensor 101 and the second image sensor 102 are configured to capture image data representing a scene in the field of view of the first camera 103 and second camera 105, respectively. In some embodiments, the first camera 103 and/or second camera 105 output analog data, which is converted by an analog front end (AFE) and/or an analog-to-digital converter (ADC) in the device 100 or embedded in the ISP 112. In some embodiments, the first camera 103 and/or second camera 105 output digital data. The digital image data may be formatted as one or more image frames, whether received from the first camera 103 and/or second camera 105 or converted from analog data received from the first camera 103 and/or second camera 105.

The first camera 103 may include the first image sensor 101 and a first lens 131. The second camera may include the second image sensor 102 and a second lens 132. Each of the first lens 131 and the second lens 132 may be controlled by an associated an autofocus (AF) algorithm (e.g., AF 133) executing in the ISP 112, which adjusts the first lens 131 and the second lens 132 to focus on a particular focal plane located at a certain scene depth. The AF 133 may be assisted by depth data received from depth sensor 140. The first lens 131 and the second lens 132 focus light at the first image sensor 101 and second image sensor 102, respectively, through one or more apertures for receiving light, one or more shutters for blocking light when outside an exposure window, and/or one or more color filter arrays (CFAs) for filtering light outside of specific frequency ranges. The first lens 131 and second lens 132 may have different field of views to capture different representations of a scene. For example, the first lens 131 may be an ultra-wide (UW) lens and the second lens 132 may be a wide (W) lens. The multiple image sensors may include a combination of ultra-wide (high field-of-view (FOV)), wide, tele, and ultra-tele (low FOV) sensors.

Each of the first camera 103 and second camera 105 may be configured through hardware configuration and/or software settings to obtain different, but overlapping, field of views. In some configurations, the cameras are configured with different lenses with different magnification ratios that result in different fields of view for capturing different representations of the scene. The cameras may be configured such that a UW camera has a larger FOV than a W camera, which has a larger FOV than a T camera, which has a larger FOV than a UT camera. For example, a camera configured for wide FOV may capture fields of view in the range of 64-84 degrees, a camera configured for ultra-side FOV may capture fields of view in the range of 100-140 degrees, a camera configured for tele FOV may capture fields of view in the range of 10-30 degrees, and a camera configured for ultra-tele FOV may capture fields of view in the range of 1-8 degrees.

In some embodiments, one or more of the first camera 103 and/or second camera 105 may be a variable aperture (VA) camera in which the aperture can be adjusted to set a particular aperture size. Example aperture sizes include f/2.0, f/2.8, f/3.2, f/8.0, etc. Larger aperture values correspond to smaller aperture sizes, and smaller aperture values correspond to larger aperture sizes. A variable aperture (VA) camera may have different characteristics that produced different representations of a scene based on a current aperture size. For example, a VA camera may capture image data with a depth of focus (DOF) corresponding to a current aperture size set for the VA camera.

The ISP 112 processes image frames captured by the first camera 103 and second camera 105. While FIG. 1 illustrates the device 100 as including first camera 103 and second camera 105, any number (e.g., one, two, three, four, five, six, etc.) of cameras may be coupled to the ISP 112. In some aspects, depth sensors such as depth sensor 140 may be coupled to the ISP 112. Output from the depth sensor 140 may be processed in a similar manner to that of first camera 103 and second camera 105. Examples of depth sensor 140 include active sensors, including one or more of indirect Time of Flight (iToF), direct Time of Flight (dToF), light detection and ranging (Lidar), mm Wave, radio detection and ranging (Radar), and/or hybrid depth sensors, such as structured light sensors. In embodiments without a depth sensor 140, similar information regarding depth of objects or a depth map may be determined from the disparity between first camera 103 and second camera 105, such as by using a depth-from-disparity algorithm, a depth-from-stereo algorithm, phase detection auto-focus (PDAF) sensors, or the like. In addition, any number of additional image sensors or image signal processors may exist for the device 100.

In some embodiments, the ISP 112 may execute instructions from a memory, such as instructions 108 from the memory 106, instructions stored in a separate memory coupled to or included in the ISP 112, or instructions provided by the processor 104. In addition, or in the alternative, the ISP 112 may include specific hardware (such as one or more integrated circuits (ICs)) configured to perform one or more operations described in the present disclosure. For example, the ISP 112 may include image front ends (e.g., IFE 135), image post-processing engines (e.g., IPE 136), auto exposure compensation (AEC) engines (e.g., AEC 134), and/or one or more engines for video analytics (e.g., EVA 137). An image pipeline may be formed by a sequence of one or more of the IFE 135, IPE 136, and/or EVA 137. In some embodiments, the image pipeline may be reconfigurable in the ISP 112 by changing connections between the IFE 135, IPE 136, and/or EVA 137. The AF 133, AEC 134, IFE 135, IPE 136, and EVA 137 may each include application-specific circuitry, be embodied as software or firmware executed by the ISP 112, and/or a combination of hardware and software or firmware executing on the ISP 112.

The memory 106 may include a non-transient or non-transitory computer readable medium storing computer-executable instructions as instructions 108 to perform all or a portion of one or more operations described in this disclosure. The instructions 108 may include a camera application (or other suitable application such as a messaging application) to be executed by the device 100 for photography or videography. The instructions 108 may also include other applications or programs executed by the device 100, such as an operating system and applications other than for image or video generation. Execution of the camera application, such as by the processor 104, may cause the device 100 to record images using the first camera 103 and/or second camera 105 and the ISP 112.

In addition to instructions 108, the memory 106 may also store image frames. The image frames may be output image frames stored by the ISP 112. The output image frames may be accessed by the processor 104 for further operations. In some embodiments, the device 100 does not include the memory 106. For example, the device 100 may be a circuit including the ISP 112, and the memory may be outside the device 100. The device 100 may be coupled to an external memory and configured to access the memory for writing output image frames for display or long-term storage. In some embodiments, the device 100 is a system-on-chip (SoC) that incorporates the ISP 112, the processor 104, the sensor hub 150, the memory 106, and/or components 116 into a single package.

In some embodiments, at least one of the ISP 112 or the processor 104 executes instructions to perform various operations described herein, including demosaicing of color image signals. For example, execution of the instructions can instruct the ISP 112 to begin or end capturing an image frame or a sequence of image frames, in which the capture includes correction as described in embodiments herein. In some embodiments, the processor 104 may include one or more general-purpose processor cores 104A-N capable of executing instructions to control operation of the ISP 112. For example, the cores 104A-N may execute a camera application (or other suitable application for generating images or video) stored in the memory 106 that activate or deactivate the ISP 112 for capturing image frames and/or control the ISP 112 in the demosaicing of color image signals for the image frames. The operations of the cores 104A-N and ISP 112 may be based on user input. For example, a camera application executing on processor 104 may receive a user command to begin a video preview display upon which a video comprising a sequence of image frames is captured and processed from first camera 103 and/or the second camera 105 through the ISP 112 for display and/or storage. Image processing to determine "output" or "corrected" image frames, such as according to techniques described herein, may be applied to one or more image frames in the sequence.

In some embodiments, the processor 104 may include ICs or other hardware (e.g., an artificial intelligence (AI) engine such as AI engine 124 or other co-processor) to offload certain tasks from the cores 104A-N. The AI engine 124 may be used to offload tasks related to, for example, face detection and/or object recognition performed using machine learning (ML) or artificial intelligence (AI). The AI engine 124 may be referred to as an Artificial Intelligence Processing Unit (AI PU). The AI engine 124 may include hardware configured to perform and accelerate convolution operations involved in executing machine learning algorithms, such as by executing predictive models such as artificial neural networks (ANNs) (including multilayer feedforward neural networks (MLFFNN), the recurrent neural networks (RNN), and/or the radial basis functions (RBF)). The ANN executed by the AI engine 124 may access predefined training weights for performing operations on user data. The ANN may alternatively be trained during operation of the image capture device 100, such as through reinforcement training, supervised training, and/or unsupervised training. In some other embodiments, the device 100 does not include the processor 104, such as when all of the described functionality is configured in the ISP 112.

In some embodiments, the display 114 may include one or more suitable displays or screens allowing for user interaction and/or to present items to the user, such as a preview of the output of the first camera 103 and/or second camera 105. In some embodiments, the display 114 is a touch-sensitive display. The input/output (I/O) components, such as components 116, may be or include any suitable mechanism, interface, or device to receive input (such as commands) from the user and to provide output to the user through the display 114. For example, the components 116 may include (but are not limited to) a graphical user interface (GUI), a keyboard, a mouse, a microphone, speakers, a squeezable bezel, one or more buttons (such as a power button), a slider, a toggle, or a switch.

While shown to be coupled to each other via the processor 104, components (such as the processor 104, the memory 106, the ISP 112, the display 114, and the components 116) may be coupled to each another in other various arrangements, such as via one or more local buses, which are not shown for simplicity. One example of a bus for interconnecting the components is a peripheral component interface (PCI) express (PCIe) bus.

While the ISP 112 is illustrated as separate from the processor 104, the ISP 112 may be a core of a processor 104 that is an application processor unit (APU), included in a system on chip (SoC), or otherwise included with the processor 104. While the device 100 is referred to in the examples herein for performing aspects of the present disclosure, some device components may not be shown in FIG. 1 to prevent obscuring aspects of the present disclosure. Additionally, other components, numbers of components, or combinations of components may be included in a suitable device for performing aspects of the present disclosure. As such, the present disclosure is not limited to a specific device or configuration of components, including the device 100.

The exemplary image capture device of FIG. 1 may be operated to obtain improved images using improved demosaicing of color image signals for color images. One example method of operating one or more cameras, such as first camera 103 and/or second camera 105, is shown in FIG. 2 and described below.

Figure 2:
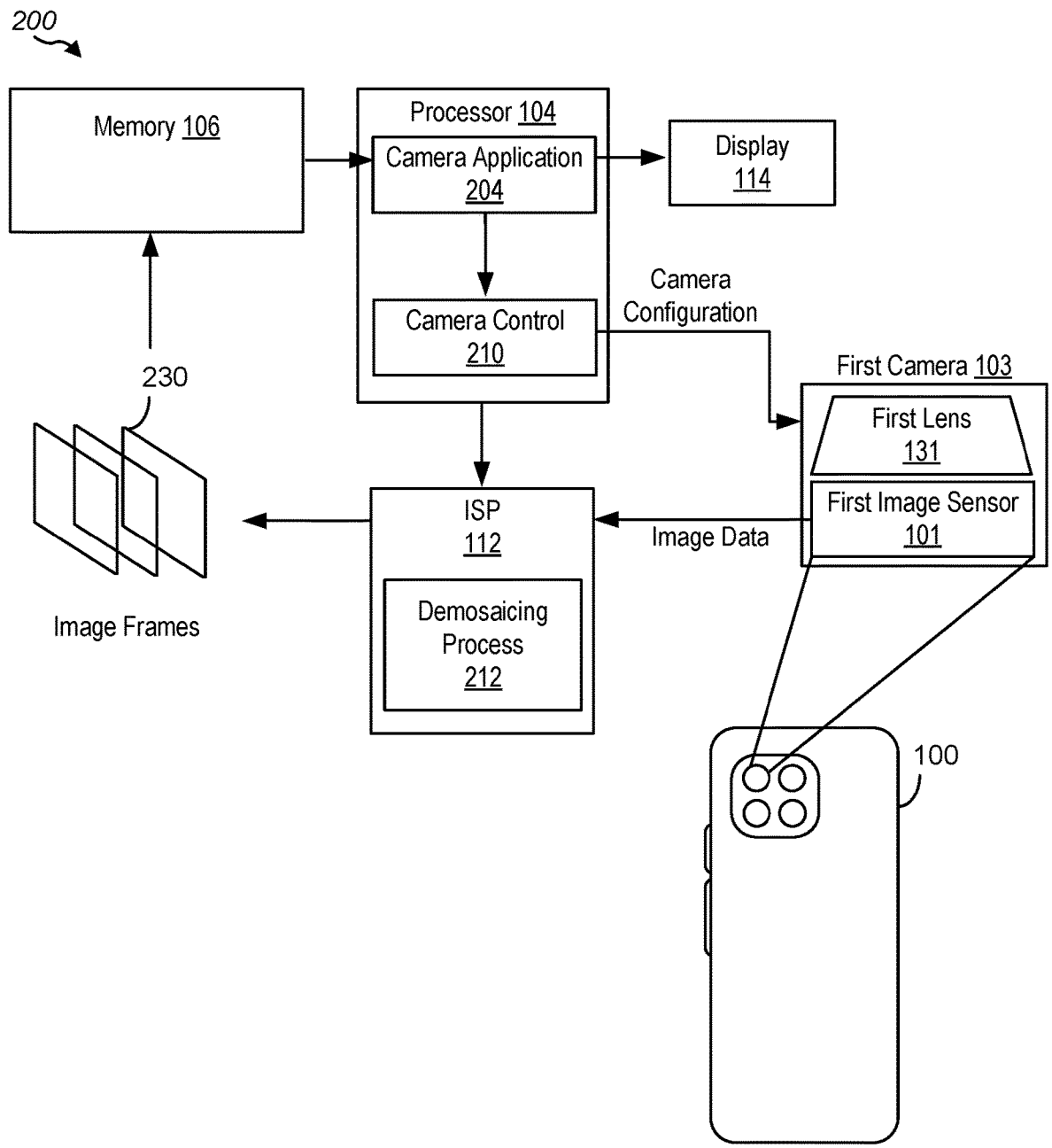
FIG. 2 is a block diagram illustrating an example data flow path for image data processing in an image capture device according to one or more embodiments of the disclosure.

FIG. 2 is a block diagram illustrating an example data flow path for image data processing in an image capture device according to one or more embodiments of the disclosures. Processor 104 of system 200 may communicate with ISP 112 through a bi-directional bus and/or separate control and data lines. The processor 104 may control the first camera 103 through camera control 210. The camera control 210 may be a camera driver executed by the processor 104 for configuring the first camera 103, such as to active or deactivate image capture, configure exposure settings, and/or configure aperture size. Camera control 210 may be managed by a camera application 204 executing on the processor 104. The camera application 204 provides settings accessible to a user such that a user can specify individual camera settings or select a profile with corresponding camera settings. Camera control 210 communicates with the first camera 103 to configure the first camera 103 in accordance with commands received from the camera application 204. The camera application 204 may be, for example, a photography application, a document scanning application, a messaging application, or other application that processes image data acquired from the first camera 103.

The camera configuration may include parameters that specify, for example, a frame rate, an image resolution, a readout duration, an exposure level, an aspect ratio, an aperture size, etc. The first camera 103 may apply the camera configuration and obtain image data representing a scene using the camera configuration. In some embodiments, the camera configuration may be adjusted to obtain different representations of the scene. For example, the processor 104 may execute a camera application 204 to instruct the first camera 103, through camera control 210, to set a first camera configuration for the first camera 103, to obtain first image data from the first camera 103 operating in the first camera configuration, to instruct the first camera 103 to set a second camera configuration for the first camera 103, and to obtain second image data from the first camera 103 operating in the second camera configuration.

In some embodiments in which the first camera 103 is a variable aperture (VA) camera system, the processor 104 may execute a camera application 204 to instruct the first camera 103 to configure to a first aperture size, obtain first image data from the first camera 103, instruct the first camera 103 to configure to a second aperture size, and obtain second image data from the first camera 103. The reconfiguration of the aperture and obtaining of the first and second image data may occur with little or no change in the scene captured at the first aperture size and the second aperture size. Example aperture sizes are f/2.0, f/2.8, f/3.2, f/8.0, etc. Larger aperture values correspond to smaller aperture sizes, and smaller aperture values correspond to larger aperture sizes. That is, f/2.0 corresponds to a larger aperture size than f/8.0.

The image data received from the first camera 103 may be processed in one or more blocks of the ISP 112 to determine output image frames 230 that may be stored in memory 106 and/or otherwise provided to the processor 104. The processor 104 may further process the image data to apply effects to the output image frames 230. Effects may include Bokeh, lighting, color casting, and/or high dynamic range (HDR) merging. In some embodiments, the effects may be applied in the ISP 112.

The output image frames 230 by the ISP 112 may include representations of the scene improved by aspects of this disclosure, such that color images are better produced through improved demosaicing (such as to reduce visual artifacts). The processor 104 may display these output image frames 230 to a user, and the improvements provided by the described processing implemented in the ISP 112 and/or processor 104 improve the image quality and the user experience by reducing the appearance of bright and dark regions in the photograph. For example, the demosaicing process 212 in the ISP 112 may correct the image data received from the first camera 103 when determining the output image frames 230.

Figure 3:
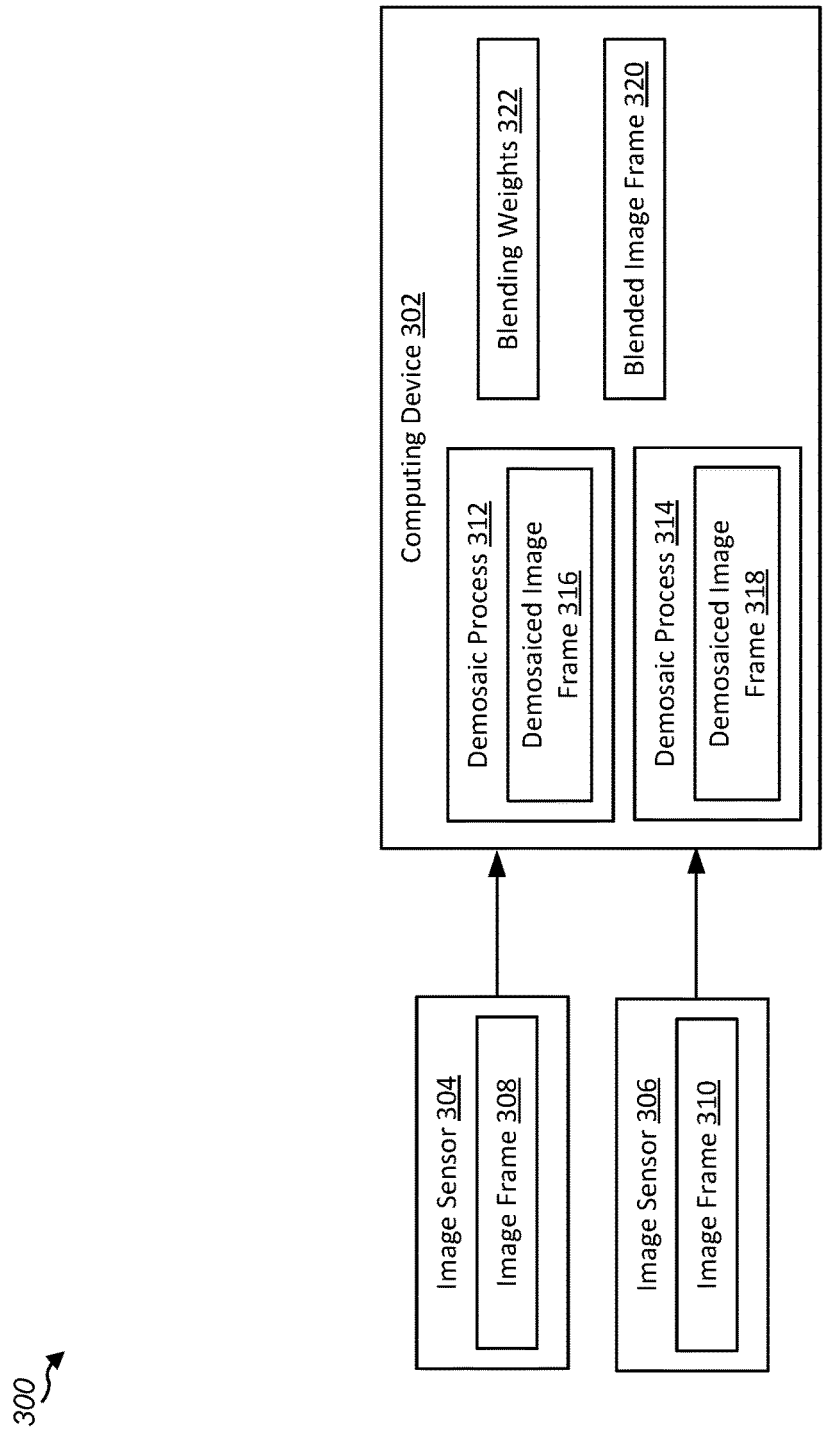
FIG. 3 is a block diagram of a system for determining output image frames for combined image sensor applications according to one aspect of the present disclosure.

FIG. 3 depicts a system 300 for determining output image frames for combined image sensor applications according to one aspect of the present disclosure. The system 300 includes a first image sensor 304, a second image sensor 306, and a computing device 302. The computing device 302 may be an exemplary implementation of the device 100, the system 200, or combinations thereof. For example, operations described herein as being performed by the computing device 302 may, in certain implementations, be performed by the device 100 or the system 200 (such as by the processor 104).

The first image sensor 304 includes a first image frame 308. The second image sensor 306 includes a second image frame 310. The computing device 302 includes a first demosaic process 312, a second demosaic process 314, blending weights 322, and a blended image frame 320. The first demosaic process 312 includes a first demosaiced image frame 316 and the second demosaic process 314 includes a second demosaiced image frame 318.

The computing device 302 may be configured to receive a first image frame 308 and a second image frame 310. In certain implementations, the first image frame 308 may be a color image frame and the second image frame 310 may be a monochromatic image frame. In certain implementations, the first image frame 308 may be determined according to different types of color pixel arrangements, such as according to the capabilities of the first image sensor 304. For example, the first image frame 308 may be stored in a red, green, blue (RGB) format, a luminance, blue projection, red projection (YUV) format, a cyan, magenta, yellow, black (CMYK) format, and the like. The second image frame 310 may be specified in one or more monochromatic image formats, such as a grayscale format. In certain implementations, the first image frame 308 may be captured by the first image sensor 304 and the second image frame 310 may be captured by the second image sensor 306. In certain implementations, the first image sensor 304 may be a color image sensor, such as a Bayer image sensor. In certain implementations, the second image sensor 306 may be a monochromatic image sensor. In additional or alternative implementations, the second image sensor 306 may be a color sensor and the second image frame 310 may be converted to a monochromatic image (such as by isolating a single color channel from the second image sensor 306). In certain implementations, the first image sensor 304 and the second image sensor 306 may have the same resolution. In additional or alternative implementations, the first image sensor 304 and the second image sensor 306 may have different resolutions. In various alternative implementations, the first image sensor 304 may be implemented using various types of color image sensors, such as Bayer sensors, color filter array (CFA) sensors, QCFA sensors, and the like.

In certain implementations, the computing device 302 may be configured to register and scale the first image frame 308 and the second image frame 310. In certain implementations, registration and scaling may be used to align the first image frame 308 with the second image frame 310 (such as to align features and portions so that they occur in the same portions of the first image frame 308 and the second image frame 310). In implementations where the resolution of the color image sensor may be the same as or may be an integer multiple (such as ¼ resolution) of the monochromatic image sensor, corresponding pixels may be aligned to scale the image. In other instances, interpolation may be performed to scale the image frames. Registration may be used to identify corresponding portions of the image frames that are later used during interpolation. Various types of registration operations may be performed, including feature-based registration, intensity-based registration, phase correlation, and the like. Feature-based registration may include identifying key features in both images and matching them to find a transformation that aligns the images. Intensity-based registration may be based on the similarity of the intensity values in corresponding pixels of both images to determine a transformation that maximizes the similarity of the intensity values. Phase correlation may use Fourier transforms to calculate the phase difference between two images and adjusting the images based on shifts in phase between corresponding frequencies of the images.

The computing device 302 may be configured to determine a first demosaiced image frame 316 by applying a first demosaic process 312 to the first image frame 308. In certain implementations, demosaic processes may be used to reconstruct a full-color image from a raw color image signal (such as the first image frame 308). In particular, the demosaic processes may be configured to reconstruct full-color images from image signals that only contain information for one color channel per pixel. For example, in a Bayer image, there are twice as many green pixels as red or blue, and each pixel value may be interpolated to generate missing color information. Demosaic processes may use various techniques, such as bilinear demosaicing, nearest-neighbor demosaicing, adaptive homogeneity-directed demosaicing (AHD), and the like. Bilinear deomosaic filtering may use an interpolation method based on the average of the surrounding pixels to estimate the missing colors. Nearest-neighbor deomosaic filtering may copy the value of the nearest available pixel for each color channel. AHD filtering may use statistical analysis to determine the best color values for each pixel. In certain implementations, the first demosaic process 312 may not receive the second image frame 310. In particular, in certain implementations, the first demosaic process 312 may be performed based solely on the first image frame 308 (such as image signal data corresponding to the first image frame 308).

Figure 4:
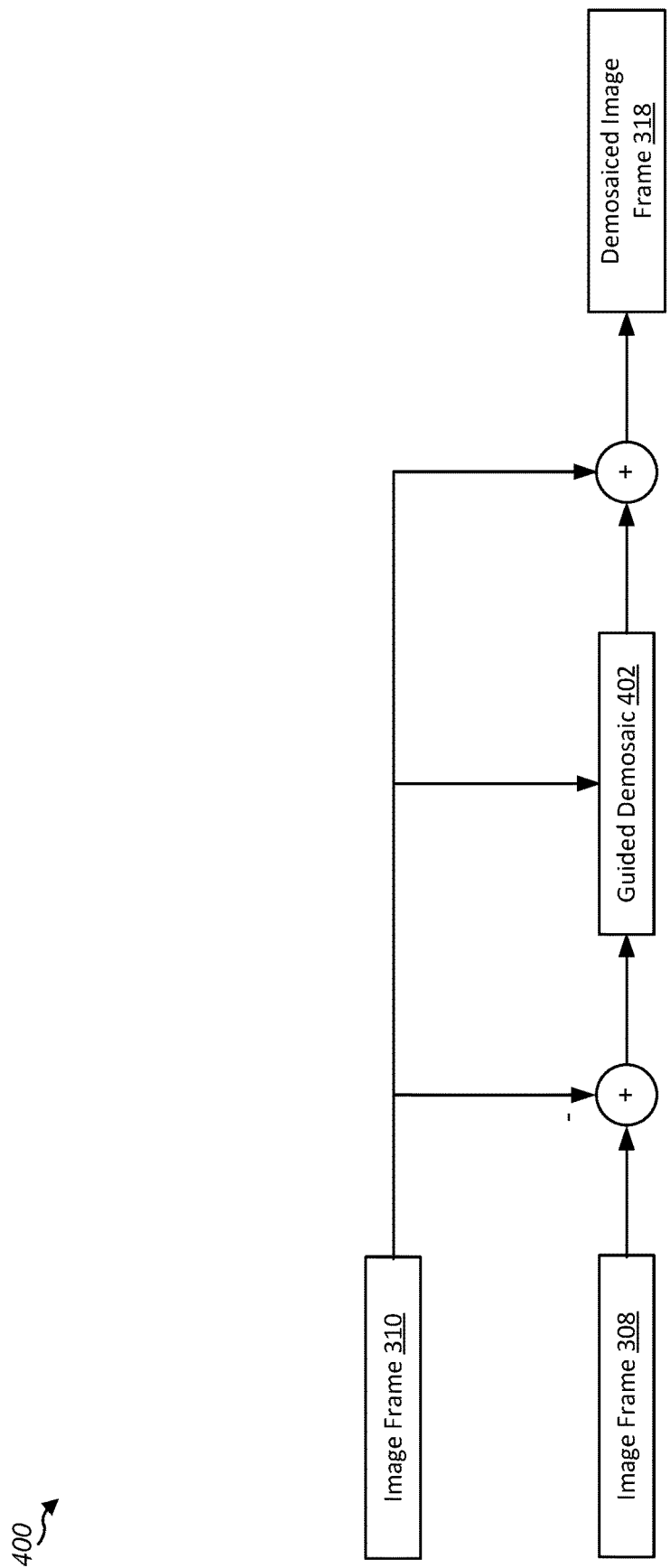
FIG. 4 is a block diagram of a guided demosaicing process according to one aspect of the present disclosure.

The computing device 302 may be configured to determine a second demosaiced image frame 318 by applying a second demosaic process 314 to the first image frame 308. The second demosaic process 314 may be applied based on the second image frame 310. The second demosaic process 314 may include one or more of the above-identified demosaic processes, similar to the first demosaic process 312. In certain implementations, the second image frame 310 may be applied as a guided filter for the second demosaic process 314. For example, FIG. 4 depicts a guided demosaicing process 400 according to one aspect of the present disclosure. In the guided demosaic process 400, pixel values from the second image frame 310 are subtracted from corresponding pixel values for the first image frame 308. The resulting image frame is then received by a guided demosaic process 402, which also receives the second image frame 310. The guided demosaic process 402 may then perform demosaicing of the resulting image frame while using the second image frame 310 as a guided filter. As one skilled in the art will appreciate, the guided filter may be determined based on structural and edge features within the second image frame 310, and may guide interpolation performed during the demosaicing process to preserve similar structural and edge features within the second demosaiced image frame 318. An output from the guided demosaic process 402 is then added together with the pixel values from the image frame 310 in order to produce the second demosaiced image frame 318. In certain implementation, the guided demosaic process 402 may apply the second image frame 310 as a guided filter on a per-pixel basis. In additional or alternative implementations, the guided demosaic process 402 may apply the image frame 310 as a guided filter on a kernel basis (such as for collections of multiple corresponding pixels). As one skilled in the art will appreciate based on the contents of this disclosure, other forms of guiding a demosaic process may be used based on the second image frame 310. All such implementations are considered within the scope of the present disclosure.

The computing device 302 may be configured to determine blending weights 322 based on the first image frame 308 and the second image frame 310. In certain implementations, the weights may be determined to identify relative amounts of the first and second demosaiced image frames 316, 318 for blending. In certain implementations, the blending weights 322 are determined based on similarities between the first image frame 308 and the second image frame 310. In certain implementations, at locations where the first image frame 308 and the second image frame 310 are more similar, a higher weight may be assigned to the second demosaiced image frame 318. In particular, lower similarity between the first image frame 308 and the second image frame 310 in a particular location in an image may indicate that features in that location require color to be distinguished (such as when the first image frame 308 is a color image frame and the second image frame 310 is a monochromatic image frame). Accordingly, it may be advantageous to preferentially weight the first demosaiced image frame 316, which was not guided by the second image frame 310. As another example, higher similarity between the first image frame 308 and the second image frame 310 in a particular location may indicate that features in that location are color independent. Accordingly, it may be advantageous to preferentially weight the second demosaiced image frame 318, which was guided by the second image frame 310, which may have a higher sensitivity.

In certain implementations, the blending weights are determined for locations within the second demosaiced image frame based on comparing corresponding locations of the first image frame and the second image frame. For example, weights assigned to the second demosaiced image frame increase based for corresponding locations of the first image frame and the second image frame with pixel values within a threshold (such as a threshold of 5%, 10%, 15% deviation, and the like). For example, pixel values may be compared based on (i) variance measurements between the first image frame 308 and the second image frame 310, (ii) texture comparisons between the first image frame 308 and the second image frame 310, (iii) edges detected within the first image frame 308 and the second image frame 310, or (iv) a combination thereof. In certain implementations, pixel values may be compared on a per-pixel basis (such as for each individual corresponding pixel within the image frames 308, 310). In additional or alternative implementations, pixel values may be compared on a kernel bases (such as for corresponding regions or collections of pixels within the image frames 308, 310). One skilled in the art may appreciate, based on this disclosure, that other forms of comparison between the first image frame 308 and the second image frame 310 may be used additionally or alternatively to those discussed above. All such implementations are considered within the scope of this disclosure.

The computing device 302 may be configured to determine a blended image frame 320 by combining pixel values from corresponding portions of the first demosaiced image frame 316 and the second demosaiced image frame 318 according to the blending weights 322. The blended image frame 320 may be determined as a weighted combination of pixel values for the first demosaiced image frame 316 and the second demosaiced image frame 318 (such as for corresponding pixels within the first and second demosaiced image frames 316, 318). In certain implementations, the blended image frame 320 may be determined as a pixelwise combination of the first demosaiced image frame 316 and the second demosaiced image frame 318. In certain implementations, the blended image frame 320 may serve as an output image frame 230. In additional or alternative implementations, the blended image frame 320 may be subsequently processed to determine the output image frame. For example, the blended image frame 320 may be used as an RGB signal for subsequent fusion operations (such as fusion operations between features within the second image frame 310 and the blended image frame 320). The fusion process may then result in an output image frame 230.

The processing in FIG. 3 may obtain an improved digital representation of a scene, which results in a photograph or video with higher image quality (IQ). Each of the operations described with reference to FIG. 3 may be performed by one or a combination of the processor 104 (including cores 104A-N or AI engine 124) and/or the ISP 112. For example, the processing performed by the computing device 302 combines the advantages of both types of images to enhance overall image quality and provide a more comprehensive representation of the scene. In particular, the proposed techniques improve the fusion techniques for combined image sensor applications, allowing for better capture of the higher sensitivity and resolution of the monochromatic images while also incorporating the improved color information from color sensors. Furthermore, the proposed techniques reduce the negative visual artifacts from the demosaicing processes, enabling the incorporation of the improved coloring information without sacrificing other aspects of the images. Accordingly, the proposed techniques improve the image quality of captured images.

Figure 5:
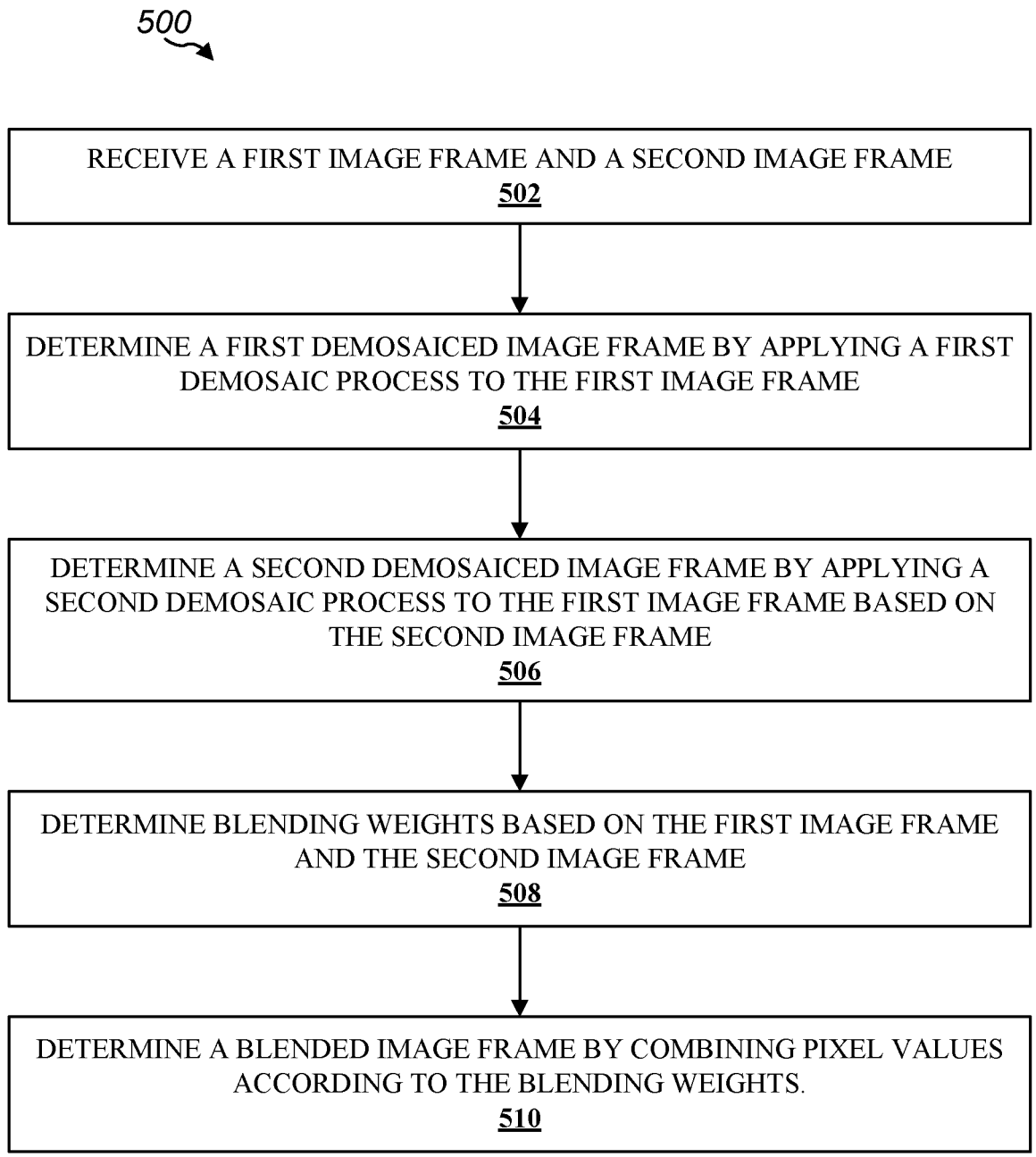
FIG. 5 shows a flow chart of an example method for processing image data to perform demosaicing according to some embodiments of the disclosure.

FIG. 5 shows a flow chart of an example method 500 for processing image data to perform demosaicing according to some embodiments of the disclosure. The systems 200, 300 may be configured to perform the operations described with reference to FIG. 5 to determine output image frames 230 (such as blended image frames 320).

The method 500 includes receiving a first image frame and a second image frame (block 502). For example, the computing device 302 may receive a first image frame 308 and a second image frame 310. In certain implementations, the first image frame 308 may be a color image frame and the second image frame 310 may be a monochromatic image frame. In certain implementations, the first image frame 308 may be captured by a first image sensor 304 and the second image frame 310 may be captured by a second image sensor 306. In certain implementations, the computing device 302 may register and scale the first image frame 308 and the second image frame 310, such as before proceeding to block 504.

The method 500 includes determining a first demosaiced image frame by applying a first demosaic process to the first image frame (block 504). For example, the computing device 302 may determine a first demosaiced image frame 316 by applying a first demosaic process 312 to the first image frame 308. In certain implementations, the first demosaic process 312 may be performed based solely on the first image frame 308 (such as image signal data corresponding to the first image frame 308).

The method 500 includes determining a second demosaiced image frame by applying a second demosaic process to the first image frame (block 506). For example, the computing device 302 may determine a second demosaiced image frame 318 by applying a second demosaic process 314 to the first image frame 308. The second demosaic process 314 may be applied based on the second image frame 310. For example, the second image frame 310 may be applied as a guided filter for the second demosaic process 314.

The method 500 includes determining blending weights based on the first image frame and the second image frame (block 508). For example, the computing device 302 may determine blending weights 322 based on the first image frame 308 and the second image frame 310. In certain implementations, the blending weights 322 are determined based on comparisons between the first image frame 308 and the second image frame 310. In certain implementations, weights assigned to the second demosaiced image frame increase for corresponding locations of the first image frame and the second image frame with pixel values within a threshold. In certain implementations, the blending weights 322 are determined based on (i) variance measurements between the first image frame 308 and the second image frame 310, (ii) texture comparisons between the first image frame 308 and the second image frame 310, (iii) edges detected within the first image frame 308 and the second image frame 310, or (iv) a combination thereof.

The method 500 includes determining a blended image frame by combining pixel values from corresponding portions of the first demosaiced image frame and the second demosaiced image frame according to the blending weights (block 510). For example, the computing device 302 may determine a blended image frame 320 by combining pixel values from corresponding portions of the first demosaiced image frame 316 and the second demosaiced image frame 318 according to the blending weights 322. In certain implementations, the blended image frame 320 may serve as an output image frame. In additional or alternative implementations, the blended image frame 320 may be subsequently processed to determine the output image frame. For example, the blended image frame 320 may be used as an RGB signal for subsequent fusion operations (such as fusion operations between features within the second image frame 310 and the blended image frame 320). The fusion process may then result in an output image frame.

Figure 6:
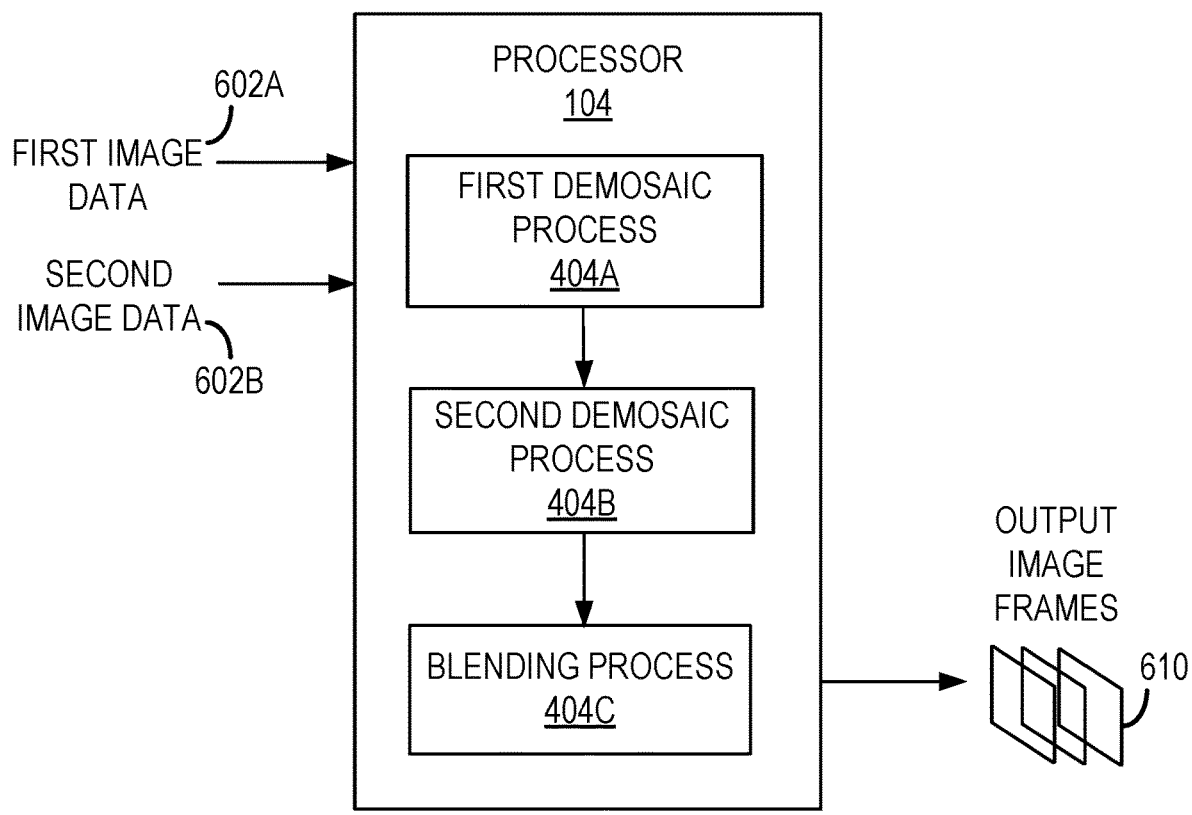
FIG. 6 is a block diagram illustrating an example processor configuration for image data processing in an image capture device according to one or more embodiments of the disclosure.

FIG. 6 is a block diagram illustrating an example processor configuration for image data processing in an image capture device according to one or more embodiments of the disclosure. The processor 104, or other processing circuitry, may be configured to operate on image data to perform one or more operations of the method of FIG. 3. The image data may be processed to determine one or more output image frames 610.

The processor 104 receives first image data 602A and second image data 602B, such as a first image frame and a second image frame. In some embodiments, the first image data and/or the second image data may be received directly from image sensors or a memory coupled to image sensors. In some embodiments, the first image data 602A and/or the second image data 602B may be retrieved from long-term storage, such as flash storage device or network location, storing a picture that was previously captured or generated. In certain implementations, the first image data 602A may be a color image frame and the second image data 602B may be a monochromatic image frame. The processor 104 includes a first demosaic process 604A, a second demosaic process 604B, and a blending process 404C. One example operation is described with reference to FIG. 6.

The first demosaic process 604A may be configured to determine a first demosaiced image frame based on the first image data 602A. For example, the first demosaic process 604A may be performed based solely on the first image data 602A. In certain implementations, the first demosaic process 604A may be an exemplary implementation of the first demosaic process 312.

The second demosaic process 604B may be configured to determine a second demosaiced image frame based on the first image data 602A. For example, the second demosaic process 604B may be applied based on the second image data 602B. As a specific example, the second image data 602B may be applied as a guided filter for the second demosaic process 604B. In certain implementations, the second demosaic process 604B may be an exemplary implementation of the second demosaic process 314.

The blending process 604C may be configured to determine blending weights based on the first image data 602A and the second image data 602B. In certain implementations, the blending weights 322 are determined based on comparisons between the first image data 602A and the second image data 602B. In certain implementations, the blending weights 322 are determined based on (i) variance measurements between the first image frame 308 and the second image frame 310, (ii) texture comparisons between the first image frame 308 and the second image frame 310, (iii) edges detected within the first image frame 308 and the second image frame 310, or (iv) a combination thereof.

The blending process 404C may also be configured to determine a blended image frame by combining pixel values from corresponding portions of the first demosaiced image frame and the second demosaiced image frame according to the blending weights. In certain implementations, the blended image frame may serve as an output image frame 410. In additional or alternative implementation, the blended image frame may be subsequently processed to determine the output image frame. For example, the blended image frame may be used as an RGB signal for subsequent fusion operations (such as fusion operations between features within the second image data 602B and the blended image frame 320). The fusion process may then result in an output image frame.

In one or more aspects, techniques for supporting image processing may include additional aspects, such as any single aspect or any combination of aspects described below or in connection with one or more other processes or devices described elsewhere herein.

A first aspect includes a method that includes receiving a first image frame and a second image frame; determining a first demosaiced image frame by applying a first demosaic process to the first image frame, determining a second demosaiced image frame by applying a second demosaic process to the first image frame based on the second image frame, determining blending weights based on the first image frame and the second image frame, and determining a blended image frame by combining pixel values from corresponding portions of the first demosaiced image frame and the second demosaiced image frame according to the blending weights.

In a second aspect, in combination with the second aspect, blending weights are determined for locations within the second demosaiced image frame based on comparing corresponding locations of the first image frame and the second image frame.

In a third aspect, in combination with the second aspect, weights assigned to the second demosaiced image frame increase based for corresponding locations of the first image frame and the second image frame with pixel values within a threshold.

In a fourth aspect, in combination with one or more of the second aspect through the third aspect, the blending weights are determined based on (i) variance measurements between the first image frame and the second image frame, (ii) texture comparisons between the first image frame and the second image frame, (iii) edges detected within the first image frame and the second image frame, or (iv) a combination thereof.

In a fifth aspect, in combination with one or more of the second aspect through the fourth aspect, blending weights are determined for each pixel within the second demosaiced image frame, and the blended image frame is determined as a pixelwise combination of the first demosaiced image frame and the second demosaiced image frame.

In a sixth aspect, in combination with one or more of the first aspect through the fifth aspect, the second image frame is applied as a guided filter for the second demosaic process.

In a seventh aspect, in combination with one or more of the first aspect through the sixth aspect, the method further includes, prior to determining the second demosaiced image frame, registering and scaling the first image frame and the second image frame.

In an eighth aspect, in combination with one or more of the first aspect through the seventh aspect, the first image frame is a color image frame and the second image frame is a monochromatic image frame.

In a ninth aspect, an apparatus is provided that includes a memory storing processor-readable code and at least one processor coupled to the memory. The at least one processor may be configured to execute the processor-readable code to cause the at least one processor to perform operations including: receiving a first image frame and a second image frame; determining a first demosaiced image frame by applying a first demosaic process to the first image frame; determining a second demosaiced image frame by applying a second demosaic process to the first image frame based on the second image frame; determining blending weights based on the first image frame and the second image frame; and determining a blended image frame by combining pixel values from corresponding portions of the first demosaiced image frame and the second demosaiced image frame according to the blending weights.

Additionally, the apparatus may perform or operate according to one or more aspects as described below. In some implementations, the apparatus includes a wireless device, such as a UE. In some implementations, the apparatus includes a remote server, such as a cloud-based computing solution, which receives image data for processing to determine output image frames. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a tenth aspect, in combination with the ninth aspect, the blending weights are determined for locations within the second demosaiced image frame based on comparing corresponding locations of the first image frame and the second image frame.

In an eleventh aspect, in combination with the tenth aspect, weights assigned to the second demosaiced image frame increase based for corresponding locations of the first image frame and the second image frame with pixel values within a threshold.

In a twelfth aspect, in combination with one or more of the tenth aspect through the eleventh aspect, the blending weights are determined based on (i) variance measurements between the first image frame and the second image frame, (ii) texture comparisons between the first image frame and the second image frame, (iii) edges detected within the first image frame and the second image frame, or (iv) a combination thereof.

In a thirteenth aspect, in combination with one or more of the tenth aspect through the twelfth aspect, blending weights are determined for each pixel within the second demosaiced image frame, and the blended image frame is determined as a pixelwise combination of the first demosaiced image frame and the second demosaiced image frame.

In a fourteenth aspect, in combination with one or more of the ninth aspect through the thirteenth aspect, the second image frame is applied as a guided filter for the second demosaic process.

In a fifteenth aspect, in combination with one or more of the ninth aspect through the fourteenth aspect, the operations further include, prior to determining the second demosaiced image frame, registering and scaling the first image frame and the second image frame.

In a sixteenth aspect, in combination with one or more of the ninth aspect through the fifteenth aspect, the first image frame is a color image frame and the second image frame is a monochromatic image frame.

A seventeenth aspect includes a non-transitory computer-readable medium storing instructions that, when executed by a processor, cause the processor to perform operations that include receiving a first image frame and a second image frame; determining a first demosaiced image frame by applying a first demosaic process to the first image frame, determining a second demosaiced image frame by applying a second demosaic process to the first image frame based on the second image frame, determining blending weights based on the first image frame and the second image frame, and determining a blended image frame by combining pixel values from corresponding portions of the first demosaiced image frame and the second demosaiced image frame according to the blending weights.

In an eighteenth aspect, in combination with the seventeenth aspect, the blending weights are determined for locations within the second demosaiced image frame based on comparing corresponding locations of the first image frame and the second image frame.

In a nineteenth aspect, in combination with the eighteenth aspect, weights assigned to the second demosaiced image frame increase based for corresponding locations of the first image frame and the second image frame with pixel values within a threshold.

In a twentieth aspect, in combination with one or more of the eighteenth aspect through the nineteenth aspect, the blending weights are determined based on (i) variance measurements between the first image frame and the second image frame, (ii) texture comparisons between the first image frame and the second image frame, (iii) edges detected within the first image frame and the second image frame, or (iv) a combination thereof.

In a twenty-first aspect, in combination with one or more of the eighteenth aspect through the twentieth aspect, blending weights are determined for each pixel within the second demosaiced image frame, and the blended image frame is determined as a pixelwise combination of the first demosaiced image frame and the second demosaiced image frame.

In a twenty-second aspect, in combination with one or more of the seventeenth aspect through the twenty-first aspect, the second image frame is applied as a guided filter for the second demosaic process.

In a twenty-third aspect, in combination with one or more of the seventeenth aspect through the twenty-second aspect, the operations further include, prior to determining the second demosaiced image frame, registering and scaling the first image frame and the second image frame.

In a twenty-fourth aspect, in combination with one or more of the seventeenth aspect through the twenty-third aspect, the first image frame is a color image frame and the second image frame is a monochromatic image frame.

A twenty-fifth aspect includes an image capture device, which includes a first image sensor, a second image sensor, a memory storing processor-readable code, and at least one processor coupled to the memory, the first image sensor, and the second image sensor. The at least one processor may be configured to execute the processor-readable code to cause the at least one processor to perform operations that include receiving a first image frame from the first image sensor and a second image frame from the second image sensor; determining a first demosaiced image frame by applying a first demosaic process to the first image frame; determining a second demosaiced image frame by applying a second demosaic process to the first image frame based on the second image frame; determining blending weights based on the first image frame and the second image frame; and determining a blended image frame by combining pixel values from corresponding portions of the first demosaiced image frame and the second demosaiced image frame according to the blending weights.

In a twenty-sixth aspect, in combination with the twenty-fifth aspect, the blending weights are determined for locations within the second demosaiced image frame based on comparing corresponding locations of the first image frame and the second image frame.

In a twenty-seventh aspect, in combination with the twenty-sixth aspect, weights assigned to the second demosaiced image frame increase based for corresponding locations of the first image frame and the second image frame with pixel values within a threshold.

In a twenty-eighth aspect, in combination with one or more of the twenty-sixth aspect through the twenty-seventh aspect, the blending weights are determined based on (i) variance measurements between the first image frame and the second image frame, (ii) texture comparisons between the first image frame and the second image frame, (iii) edges detected within the first image frame and the second image frame, or (iv) a combination thereof.

In a twenty-ninth aspect, in combination with one or more of the twenty-sixth aspect through the twenty-eighth aspect, blending weights are determined for each pixel within the second demosaiced image frame, and the blended image frame is determined as a pixelwise combination of the first demosaiced image frame and the second demosaiced image frame.

In a thirtieth aspect, in combination with one or more of the twenty-fifth aspect through the twenty-ninth aspect, the second image frame is applied as a guided filter for the second demosaic process.

In the figures, a single block may be described as performing a function or functions. The function or functions performed by that block may be performed in a single component or across multiple components, and/or may be performed using hardware, software, or a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory, and the like.

Aspects of the present disclosure are applicable to any electronic device including, coupled to, or otherwise processing data from one, two, or more image sensors capable of capturing image frames (or "frames"). The terms "output image frame," "modified image frame," and "corrected image frame" may refer to an image frame that has been processed by any of the disclosed techniques to adjust raw image data received from an image sensor. Further, aspects of the disclosed techniques may be implemented for processing image data received from image sensors of the same or different capabilities and characteristics (such as resolution, shutter speed, or sensor type). Further, aspects of the disclosed techniques may be implemented in devices for processing image data, whether or not the device includes or is coupled to image sensors. For example, the disclosed techniques may include operations performed by processing devices in a cloud computing system that retrieve image data for processing that was previously recorded by a separate device having image sensors.

Unless specifically stated otherwise as apparent from the following discussions, it is appreciated that throughout the present application, discussions using terms such as "accessing," "receiving," "sending," "using," "selecting," "determining," "normalizing," "multiplying," "averaging," "monitoring," "comparing," "applying," "updating," "measuring," "deriving," "settling," "generating," or the like, refer to the actions and processes of a computer system, or similar electronic computing device, that manipulates and transforms data represented as physical (electronic) quantities within the computer system's registers and memories into other data similarly represented as physical quantities within the computer system's registers, memories, or other such information storage, transmission, or display devices. The use of different terms referring to actions or processes of a computer system does not necessarily indicate different operations. For example, "determining" data may refer to "generating" data. As another example, "determining" data may refer to "retrieving" data.

The terms "device" and "apparatus" are not limited to one or a specific number of physical objects (such as one smartphone, one camera controller, one processing system, and so on). As used herein, a device may be any electronic device with one or more parts that may implement at least some portions of the disclosure. While the description and examples herein use the term "device" to describe various aspects of the disclosure, the term "device" is not limited to a specific configuration, type, or number of objects. As used herein, an apparatus may include a device or a portion of the device for performing the described operations.

Certain components in a device or apparatus described as "means for accessing," "means for receiving," "means for sending," "means for using," "means for selecting," "means for determining," "means for normalizing," "means for multiplying," or other similarly-named terms referring to one or more operations on data, such as image data, may refer to processing circuitry (e.g., application specific integrated circuits (ASICs), digital signal processors (DSP), graphics processing unit (GPU), central processing unit (CPU), computer vision processor (CVP), or neural signal processor (NSP)) configured to perform the recited function through hardware, software, or a combination of hardware configured by software.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to the Figures referenced above include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill in the art that one or more blocks (or operations) described with reference to FIGS. 5 and 6 may be combined with one or more blocks (or operations) described with reference to another of the figures. For example, one or more blocks (or operations) of FIG. 5 may be combined with one or more blocks (or operations) of FIGS. 1-3. As another example, one or more blocks associated with FIG. 6 may be combined with one or more blocks (or operations) associated with FIGS. 1-3.

Those of skill in the art would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits, and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, which is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein but are to be accorded the widest scope consistent with this disclosure, the principles and the novel features disclosed herein.

Additionally, a person having ordinary skill in the art will readily appreciate, opposing terms such as "upper" and "lower," or "front" and back," or "top" and "bottom," or "forward" and "backward" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown, or in sequential order, or that all illustrated operations be performed to achieve desirable results. Further, the drawings may schematically depict one or more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof.

The term "substantially" is defined as largely, but not necessarily wholly, what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method comprising:
  receiving a first image frame and a second image frame;
  determining a first demosaiced image frame by applying a first demosaic process to the first image frame;
  determining a second demosaiced image frame by applying a second demosaic process to the first image frame based on the second image frame;
  determining blending weights based on the first image frame and the second image frame; and
  determining a blended image frame by combining pixel values from corresponding portions of the first demosaiced image frame and the second demosaiced image frame according to the blending weights.

2. The method of claim 1, wherein the blending weights are determined for locations within the second demosaiced image frame based on comparing corresponding locations of the first image frame and the second image frame.

3. The method of claim 2, wherein, weights assigned to the second demosaiced image frame increase based for corresponding locations of the first image frame and the second image frame with pixel values within a threshold.

4. The method of claim 2, wherein the blending weights are determined based on (i) variance measurements between the first image frame and the second image frame, (ii) texture comparisons between the first image frame and the second image frame, (iii) edges detected within the first image frame and the second image frame, or (iv) a combination thereof.

5. The method of claim 2, wherein blending weights are determined for each pixel within the second demosaiced image frame, and the blended image frame is determined as a pixelwise combination of the first demosaiced image frame and the second demosaiced image frame.

6. The method of claim 1, wherein the second image frame is applied as a guided filter for the second demosaic process.

7. The method of claim 1, further comprising, prior to determining the second demosaiced image frame, registering and scaling the first image frame and the second image frame.

8. The method of claim 1, wherein the first image frame is a color image frame and the second image frame is a monochromatic image frame.

9. An apparatus, comprising:
a memory storing processor-readable code; and
at least one processor coupled to the memory, the at least one processor configured to execute the processor-readable code to cause the at least one processor to perform operations including:
receiving a first image frame and a second image frame;
determining a first demosaiced image frame by applying a first demosaic process to the first image frame;
determining a second demosaiced image frame by applying a second demosaic process to the first image frame based on the second image frame;
determining blending weights based on the first image frame and the second image frame; and
determining a blended image frame by combining pixel values from corresponding portions of the first demosaiced image frame and the second demosaiced image frame according to the blending weights.

10. The apparatus of claim 9, wherein the blending weights are determined for locations within the second demosaiced image frame based on comparing corresponding locations of the first image frame and the second image frame.

11. The apparatus of claim 10, wherein, weights assigned to the second demosaiced image frame increase based for corresponding locations of the first image frame and the second image frame with pixel values within a threshold.

12. The apparatus of claim 10, wherein the blending weights are determined based on (i) variance measurements between the first image frame and the second image frame, (ii) texture comparisons between the first image frame and the second image frame, (iii) edges detected within the first image frame and the second image frame, or (iv) a combination thereof.

13. The apparatus of claim 10, wherein blending weights are determined for each pixel within the second demosaiced image frame, and the blended image frame is determined as a pixelwise combination of the first demosaiced image frame and the second demosaiced image frame.

14. The apparatus of claim 9, wherein the second image frame is applied as a guided filter for the second demosaic process.

15. The apparatus of claim 9, further comprising, prior to determining the second demosaiced image frame, registering and scaling the first image frame and the second image frame.

16. The apparatus of claim 9, wherein the first image frame is a color image frame and the second image frame is a monochromatic image frame.

17. A non-transitory computer-readable medium storing instructions that, when executed by a processor, cause the processor to perform operations comprising:
receiving a first image frame and a second image frame;
determining a first demosaiced image frame by applying a first demosaic process to the first image frame;
determining a second demosaiced image frame by applying a second demosaic process to the first image frame based on the second image frame;
determining blending weights based on the first image frame and the second image frame; and
determining a blended image frame by combining pixel values from corresponding portions of the first demosaiced image frame and the second demosaiced image frame according to the blending weights.

18. The non-transitory computer-readable medium of claim 17, wherein the blending weights are determined for locations within the second demosaiced image frame based on comparing corresponding locations of the first image frame and the second image frame.

19. The non-transitory computer-readable medium of claim 18, wherein, weights assigned to the second demosaiced image frame increase based for corresponding locations of the first image frame and the second image frame with pixel values within a threshold.

20. The non-transitory computer-readable medium of claim 18, wherein the blending weights are determined based on (i) variance measurements between the first image frame and the second image frame, (ii) texture comparisons between the first image frame and the second image frame, (iii) edges detected within the first image frame and the second image frame, or (iv) a combination thereof.

21. The non-transitory computer-readable medium of claim 18, wherein blending weights are determined for each pixel within the second demosaiced image frame, and the blended image frame is determined as a pixelwise combination of the first demosaiced image frame and the second demosaiced image frame.

22. The non-transitory computer-readable medium of claim 17, wherein the second image frame is applied as a guided filter for the second demosaic process.

23. The non-transitory computer-readable medium of claim 17, further comprising, prior to determining the second demosaiced image frame, registering and scaling the first image frame and the second image frame.

24. The non-transitory computer-readable medium of claim 17, wherein the first image frame is a color image frame and the second image frame is a monochromatic image frame.

25. An image capture device, comprising:
a first image sensor;
a second image sensor;

a memory storing processor-readable code; and at least one processor coupled to the memory, the first image sensor, and the second image sensor, the at least one processor configured to execute the processor-readable code to cause the at least one processor to perform operations comprising:

receiving a first image frame from the first image sensor and a second image frame from the second image sensor;

determining a first demosaiced image frame by applying a first demosaic process to the first image frame;

determining a second demosaiced image frame by applying a second demosaic process to the first image frame based on the second image frame;

determining blending weights based on the first image frame and the second image frame; and determining a blended image frame by combining pixel values from corresponding portions of the first demosaiced image frame and the second demosaiced image frame according to the blending weights.

26. The image capture device of claim 25, wherein the blending weights are determined for locations within the second demosaiced image frame based on comparing corresponding locations of the first image frame and the second image frame.

27. The image capture device of claim 26, wherein, weights assigned to the second demosaiced image frame increase based for corresponding locations of the first image frame and the second image frame with pixel values within a threshold.

28. The image capture device of claim 26, wherein the blending weights are determined based on (i) variance measurements between the first image frame and the second image frame, (ii) texture comparisons between the first image frame and the second image frame, (iii) edges detected within the first image frame and the second image frame, or (iv) a combination thereof.

29. The image capture device of claim 26, wherein blending weights are determined for each pixel within the second demosaiced image frame, and the blended image frame is determined as a pixelwise combination of the first demosaiced image frame and the second demosaiced image frame.

30. The image capture device of claim 25, wherein the second image frame is applied as a guided filter for the second demosaic process.

* * * * *